(12) United States Patent
Copeland et al.

(10) Patent No.: US 8,713,289 B2
(45) Date of Patent: Apr. 29, 2014

(54) EFFICIENTLY EMULATING COMPUTER ARCHITECTURE CONDITION CODE SETTINGS WITHOUT EXECUTING BRANCH INSTRUCTIONS

(75) Inventors: Reid T. Copeland, Toronto (CA); Patrick R. Doyle, Toronto (CA); Charles B. Hall, Calgary (CA); Andrew Johnson, Hampshire (GB); Ali I. Sheikh, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1187 days.

(21) Appl. No.: 11/668,623

(22) Filed: Jan. 30, 2007

(65) Prior Publication Data

US 2008/0184014 A1 Jul. 31, 2008

(51) Int. Cl.
*G06F 9/455* (2006.01)

(52) U.S. Cl.
USPC ............................................. 712/220; 703/26

(58) Field of Classification Search
USPC .......... 712/209, 221, 227, 220; 717/124, 134, 717/136, 137, 138; 703/26
See application file for complete search history.

(56) References Cited

U.S. PATENT DOCUMENTS

| | | | | |
|---|---|---|---|---|
| 5,313,614 | A * | 5/1994 | Goettelmann et al. | 717/138 |
| 5,574,927 | A * | 11/1996 | Scantlin | 712/41 |
| 5,774,694 | A | 6/1998 | Murari | |
| 6,049,864 | A * | 4/2000 | Liu et al. | 712/214 |
| 6,807,625 | B1 * | 10/2004 | Knebel et al. | 712/221 |
| 7,331,040 | B2 * | 2/2008 | Sandham et al. | 717/136 |
| 2003/0093649 | A1 | 5/2003 | Hilton | 712/41 |
| 2006/0173931 | A1 | 8/2006 | Broadhurst | |

FOREIGN PATENT DOCUMENTS

| | | |
|---|---|---|
| EP | 1455273 | 9/2004 |
| JP | S58195963 A | 11/1983 |
| JP | 2004152201 A | 5/2004 |
| WO | WO 97/50031 | 12/1997 |

OTHER PUBLICATIONS

International Search Report PCT/EP2008/050725 Apr. 18, 2008.

* cited by examiner

*Primary Examiner* — David J Huisman
(74) *Attorney, Agent, or Firm* — Steven Chiu, Esq.; Blanche E. Schiller, Esq.; Heslin Rothenberg Farley & Mesiti P.C.

(57) ABSTRACT

Emulation of source machine instructions is provided in which target machine CPU condition codes are employed to produce emulated condition code settings without the use, encoding or generation of branching instructions.

20 Claims, 4 Drawing Sheets

EFFICIENTLY EMULATING COMPUTER ARCHITECTURE CONDITION CODE SETTINGS WITHOUT EXECUTING BRANCH INSTRUCTIONS

TECHNICAL FIELD

This invention relates in general to the emulation of computer system architectures, and more particularly, to methods and systems for handling condition code settings encountered in the emulation process. Even more particularly, the present invention is directed to providing sequences of instructions that produce valid condition code settings without the use of branching instructions from the target architecture.

BACKGROUND OF THE INVENTION

In virtually all modern data processing systems, the execution of various operations such as arithmetic operations, logical operations and even data transfer operations, may result in the generation of several bits of data to indicate the outcome status of instruction execution. These bits are typically referred to as condition codes. As a simple example, a special condition code setting may be set after an arithmetic addition which results in an overflow due to the addends being too large for the number of bits available for the result. The use of condition codes permeates the execution of almost every instruction.

A classic example of an instruction which produces condition code changes upon execution is the compare instruction which sets a condition code to "zero" if the operands are equal, to "one" if the first operand is strictly less than the second operand and to "two" if the first operand is strictly greater than the second operand. The compare instruction represents an archetypical use of condition code settings.

For a number of reasons, it may be desirable to emulate the instructions designed for one computer architecture on another system with a different set of executable instructions. For example, emulation may be employed in system design or test. It may also be employed to expand the capabilities of one data processing system so that it is enabled to handle instructions written for another system. The present invention relates to the handling of condition code settings in the context of instruction emulation. While the systems and methods of the present invention are widely applicable to any emulation method where condition codes are present, it is particularly applicable to the emulation of the z/Architecture. However, the principles set forth herein are applicable to any source architecture and to any target architecture.

In the principle emulation environment considered in the present description, it is the job of emulation software to accept, as input, strings of source architecture instructions and to generate therefrom strings of instructions that, when run on the target architecture, produce the same results. These results include the setting of various condition codes, such as sign, carry, overflow and various others indicating exceptions and machine states. It is noted that while an emulation environment preferably results in the setting of hardware or condition code elements in the target architecture, the present invention also contemplates the situation in which condition codes are generated and stored in locations other than condition code registers in the target machine.

It is to be particularly noted that the present invention, deliberately avoids the conventional handling of condition code generation. An example of this difference is provided through a brief consideration of the compare instruction. This instruction compares two operands and sets a two bit condition code according to the outcome of the comparison. For example, if the comparison of the two operands determines that they are the same, the condition code is set to zero. If it is determined that the first operand is strictly less than the second operand the condition code is set to one. Lastly, if it is determined that the first operand is greater than the second operand, the condition code is set to two. In conventional approaches to the emulation of a compare instruction, the result is the construction of a sequence of instructions, which include three branch instructions. For the reasons set forth immediately below the presence of branch instructions in the target architecture instruction stream is undesirable.

Branch instructions are undesirable for at least two reasons. In particular, it is noted that most modern data processing architectures include features known as branch prediction. In these architectures, a guess is made as to which of two or more paths that the instruction stream will follow after encountering a branch instruction. If a correct guess is made, then all is well and machine processing time is thereby speeded up. However, if an incorrect to guess is made the machine hardware must backtrack through the path taken, and then take another path. At this point in time, the branch instruction is seen to be a detriment to overall processing speed. Accordingly, it is seen that branch instructions introduce complications which are not otherwise present. Furthermore, as a second reason for their avoidance, is noted that branch instructions actually consume the aforementioned branch prediction resources so that they are thus not available for other instruction streams being executed by a processor. Thus branch instructions are not only potentially wasteful in and of themselves, they also deprive other instruction streams of limited, yet valuable, computer resources.

Accordingly, it is seen that the designer of emulation systems is faced with the paradoxical choice of needing branch instructions to successfully emulate the generation of condition code settings in target architectures while at the same time desiring to avoid branching instructions because of their disadvantages. This problem is especially severe when condition code generation and functionality in the target architecture are quite different from that found in the architecture of the source machine.

It is to be particularly noted that computer programs that emulate the machine state of the z/Architecture deal with many z/Architecture instructions that modify the condition codes. In short, the z/Architecture is a prime exemplar of an architecture in which condition code settings are typically quite different than that found in other architectures, especially ones that have historically grown up from relatively simple microprocessor designs. Additionally, the modification of condition code settings in the z/Architecture is pervasive. The generation and use of condition code settings is most typically found as the result of performing an arithmetic, logical or compare operations after which one or more condition code settings are changed based on the result or other factors. The pervasiveness of condition code modifying instructions in the z/Architecture and the sometimes arbitrary semantics of these instructions introduces complicated control flow to the stream of instructions that are ultimately executed on the target architecture. This control flow adds considerable space and performance overhead to the emulated instructions. The present invention is directed to more efficiently handling this situation. While the method and system herein are particularly applicable to the so-called z/Architecture which is present in large data processing systems manufactured and sold by the assignee of the present invention, it is by no means limited to that architecture as a base of supply for source instructions.

It should also be noted that the present invention is employed in two contexts or modes. In one mode, source computer instructions are converted into target machine instructions for later execution. In another mode of operation, more akin to the operation of interpreters, source instructions are converted into target instructions for immediate execution. The present invention, in its broadest scope, contemplates both of these modalities of operation.

SUMMARY OF THE INVENTION

In a method for emulating computer instructions from a source machine to produce sequences of instructions on a target machine, the present invention generates a sequence of target machine instructions which together operate to directly calculate target machine condition codes from carry, sign and overflow codes without the use of branch instructions from the target machine. The direct calculation avoids the use of branching instructions whose disadvantages are cited above.

The present invention provides specific guiding techniques and several sequences derived from these techniques to efficiently set conditions codes or detect exceptional cases in an emulated binary translation environment for the z/Architecture. These techniques are specifically directed to situations in which the PowerPC architecture and the Intel IA32 architectures are employed to emulate the z/Architecture. The sequences of the present inventions are more efficient and generally smaller as opposed to a more straightforward method that requires more flow control. However, it is noted that the principals, techniques and methods of the present invention are not limited to any particular target machine architecture. The two exemplar architectures discussed herein are merely the most currently ones anticipated to be of the greatest value.

Additional features and advantages are realized through the techniques of the present invention. Other embodiments and aspects of the invention are described in detail herein and are considered a part of the claimed invention.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
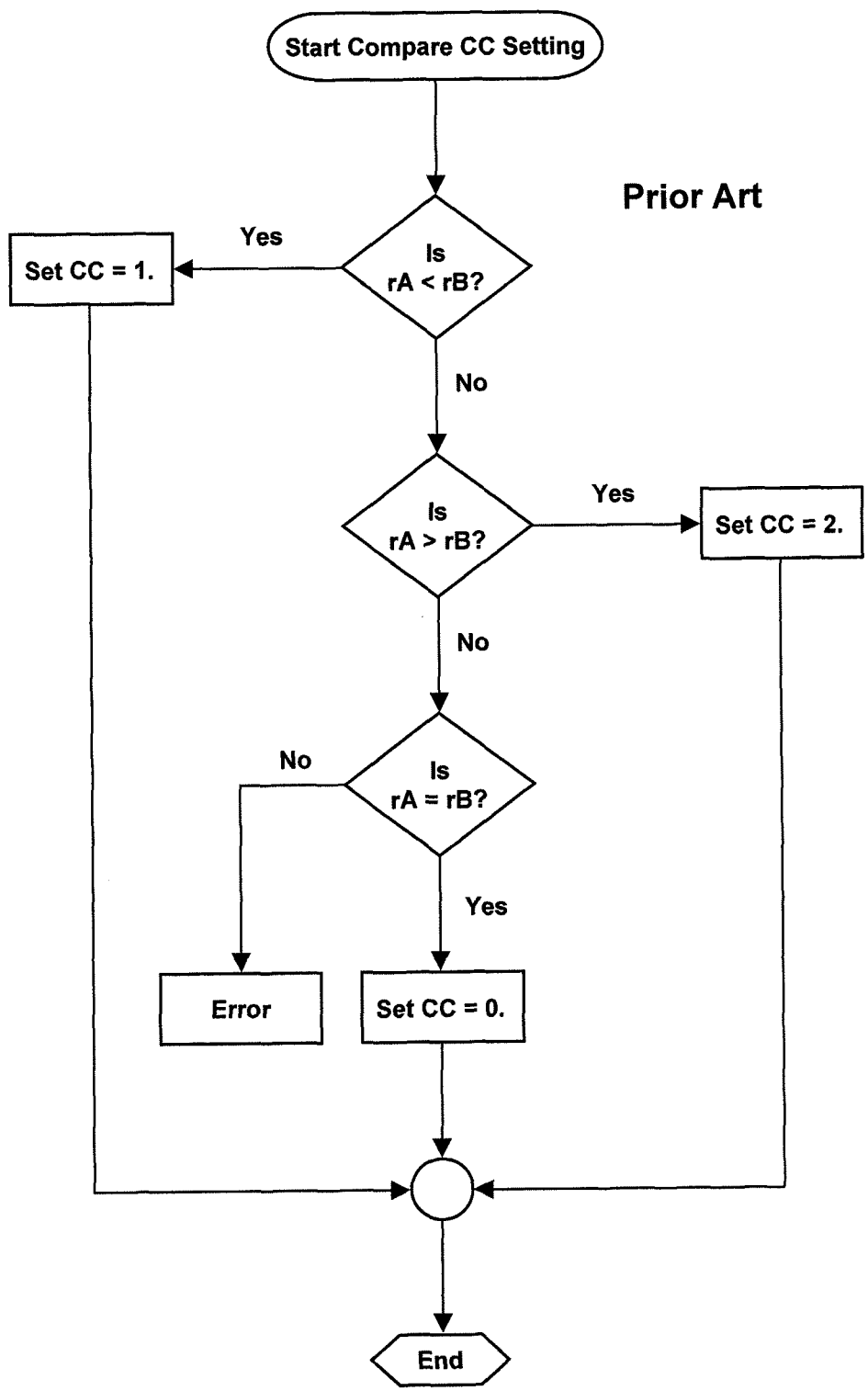
FIG. 1 is a flow chart indicating the fact that conventional handling of condition code settings in an emulation environment employs up to three branch instructions.

The technique used herein to derive the sequences is to implement very short one or two instruction sequence fragments that set a bit or bits in a result or temporary register to distinguish each possible outcome of a condition code setting. These small code fragments typically manipulate the carry, sign and overflow bits and are tied together into slightly larger sequences by standard and usually high-performing shifts, rotates and various arithmetic or Boolean instructions available on most computer architectures. Very efficient sequences result by avoiding both branch instructions and more complex instructions that are less likely to be optimized in hardware.

In some cases it is possible and efficient to manipulate the PowerPC condition code register itself to derive the z/Architecture condition code settings. In these cases a PowerPC record form instruction is used and the resulting PowerPC condition register is manipulated by rotations and logical operations to derive the corresponding z/Architecture condition code setting.

The examples below are in assembler pseudocode and are applicable to most architectures that can manipulate a carry bit and have the usual shift/rotate/negate instructions. The assembler pseudocode used is purposefully verbose so as to make the implied semantics clear. In some cases non-standard mnemonics are used when an efficient way to implement a particular operation is more likely to vary on different architectures. These non-standard mnemonics are explained more fully in the table below. In each case rX and rY are named target machine registers and "b" is an immediate value. The carry_bit is the carry out of the high order bit position.

TABLE I

| Instruction | | Description |
| --- | --- | --- |
| get_bit | rX, rY, b | The least significant bit in rX receives the bit value (0 or 1) from position b in rY and the rest of rX is set to zero |
| get_sign_bit | rX, rY | places the sign bit from rY in rX and clears the rest of rX |
| double | rX, rY | doubles the value in rY and places the result in rX |
| set_bit_on_zero | rX, rY | if rY contains 0 then a 1 is placed in rX otherwise a 0 is placed in rX |
| set_bit_on_not_zero | rX, rY | if rY contains a non-zero value then a 1 is placed in rX otherwise a 0 is placed in rX |
| add_to_carry | rX, rY, rZ | rX = rY + rZ + carry_bit. This operation is also assumed to set the carry bit based on the result of the add. |

TABLE I-continued

| Instruction | | Description |
|---|---|---|
| add_set_carry | rX, rY, rZ | rX = rY + rZ and the carry bit is set based on the result of the add. Similar semantics for sub_set_carry (subtract). |
| add_to_carry_immed | rX, rY, imm | rX = rY + imm + carry_bit. This operation is also assumed to set the carry bit based on the result of the add. |
| add_set_carry_immed | rX, rY, imm | rX = rY + imm and set the carry bit based on the result of the add. |
| move_from_carry | rX | rX = carry bit |
| flip_bit | rX, rY, b | The bit value at position b of rY is changed from either 0 to 1 or 1 to 0 and the entire changed register value is placed in rX |

Bits are numbered from 0-63 for a 64 bit register and 0-31 for a 32 bit register. 0 is the most significant position and 31 or 63 is the least significant position. In the description below, the following register naming conventions are used:

rA, rB—the first and second operand, respectively, of the z/Architecture instruction evaluated into a register;

rT—the result value of the z/Architecture instruction computed into a register;

rX, rY, rZ—temporary registers used to hold intermediate results;

rC—the register that will hold the condition code value at the end of the sequence.

Various sequences derived via this technique are listed and discussed below. As indicated above, the compare instruction is an archetypical example of an instruction which sets condition codes. Accordingly, a sequence for emulating condition code settings is provided below. The sequence provided is typical of the approach taken in the practice of the present invention. In particular, the subject source instruction is the z/Architecture Instruction called the Compare Logical operation. The example assumes that rA and rB are zero-extended in a 64 bit environment (only when compare instruction operates on 32 bit operands).

ing value in the register location rC would employ multiple branch instructions as shown in FIG. 1. These conventional approaches, as well as the present process, operate so as to provide a proper indication of the carry bit for use by the emulation software.

With respect to instruction [1], its execution sets the carry bit (that is, the CPU carry bit) to "1" in the case that rA≥rB and to "0" in the case that rA<rB. Additionally, rC contains the result of the subtraction, which, notably could be "0." The entries "rC>0," "rC=0" and "rC<0" in the table above are meant to provide an indication of the resulting condition. After the execution of instruction [2] (set_bit_on_zero), the status of register rC is unchanged but the contents of rX are set equal to "1" if the two operands, rA and rB, are the same based on the contents or rC (limited to zero or not in this case). The execution of instruction [2] does not affect the contents of rC. Additionally, instruction [2] does not affect the CPU carry bit. With respect to instruction [3] (set_bit_on_not_zero), rC is set equal to "1" whenever rC is not zero, that is, whenever rA is not equal to rB. The CPU carry bit is unaffected by instruction [3]. Thus, at this point, if rA>rB or if rA<rB, then rC=1, but if rA=rB, then rC=0. Note that at this point, rX is set up to provide discrimination information distinguishing equality

TABLE II

| [1] | sub_set_carry | rC, rA, rB |
| [2] | set_bit_on_zero | rX, rC |
| [3] | set_bit_on_not_zero | rC, rC |
| [4] | add_to_carry_immed | rC, rC, 0 |
| [5] | sub | rC, rC, rX |

| | rA > rB Register Contents | | | rA = rB Register Contents | | | rA < rB Register Contents | | |
|---|---|---|---|---|---|---|---|---|---|
| Instruction | rC | rX | Carry | rC | rX | Carry | rC | rX | Carry |
| [1] | rC > 0 | N/A | 1 | rC = 0 | N/A | 1 | rC < 0 | N/A | 0 |
| [2] | rC > 0 | 0 | 1 | rC = 0 | 1 | 1 | rC < 0 | 0 | 0 |
| [3] | 1 | 0 | 1 | 0 | 1 | 1 | 1 | 0 | 0 |
| [4] | 2 | 0 | N/A | 1 | 1 | N/A | 1 | 0 | N/A |
| [5] | 2 | 0 | N/A | 0 | 1 | N/A | 1 | 0 | N/A |

As the table above indicates, after the execution of "sub_set_carry" (instruction [1]), the condition of register rX is not applicable. Execution of instruction [1] in the target machine, however, does set a carry bit in the CPU state which is accessed by later instructions. This is indicated in the "Carry" column in the table which refers to the carry bit flag in the target machine. It is important to note and to realize that this carry bit, like many other flag bits in the target machine, is not set in the target machine in the same manner or under the same conditions as are present in the source machine. At this point, conventional approaches to setting a corresponding from inequality and that this occurs outside of (that is, apart from) both rC and the CPU carry bit.

Instruction [4] (add_to_carry_immed) is then executed with the arguments shown (rC, rC, 0), with "0" being an immediate operand. With the operands shown, it carries out the operation: rC+"CPU carry bit"+0. While it also sets the CPU carry bit as well, this result is not required for subsequent processing. It is seen in Table II above that if rA>rB then the contents of rC are now "2"; if rA=rB, then the contents of rC are "1"; and if rA<rB, then the contents of rC are also "1." At this stage it is relevant to note that there is provided an indication in rC for which the case rA>rB is distinguished from the other two cases (rA=rB and rA<rB).

The execution of instruction [5] (sub), with operands "rC, rC, rX" provides the last step in which the contents of rX, now denoting equality, are subtracted from rC as mechanism for distinguishing the case that rA=rB from the case that rA<rB since the case of equality results in the subtraction of "1" from "1" and placing the result "0" in rC. Thus, at the end of the instruction sequence set out above, the following results are obtained: rC=2 if rA>rB; rC=1 if rA<rB; and rC=0 if rA=rB.

In this manner, then, it is seen that desired emulator results for condition code settings are obtained without the execution of any branching instructions. The concepts presented above are equally applicable to the emulation of any source instruction which produces a condition code change. While the above example is specifically directed to the setting of a carry bit, it is equally applicable to other target architecture condition code bits, such as the sign and overflow bits.

As another example of the application of the present invention to providing condition code generation in an emulation environment the Add Logical (32 bit) and Add Logical (64 bit) instructions are considered below. As with the Compare Logical example discussed above, rA and rB are assumed to be zero extended for a 64 bit target architecture environment for Add Logical (32 bit). The following is a sequence in pseudo-assembly code which provides the proper setting in the location rC at the end of the process. Below, c is the carry bit.

and second locations to provide an indication in one of the two emulator accessible instructions in which at least three cases are distinguished.

Even more generally, the present process is directed to emulation methods which do not employ target machine branch instructions but rather employ target machines instructions whose executions result in the control of target machine condition codes which are used in subsequently executed non-branch instructions in ways that are used to distinguish one or more result states which are made available in a location which an emulator can employ as a condition code emulation location.

It is noted that the process set forth herein contemplates that it encompasses both the generation of suitable sequences of instructions to be executed on a target machine and the actual execution of those instructions on a target machine, whether that execution occurs immediately upon the sequence for a source instruction being generated, as one might find in an "interpretive" environment or in a "compilation-like" environment, where actual execution might occur at a later time, if necessarily at all.

Figure 3:
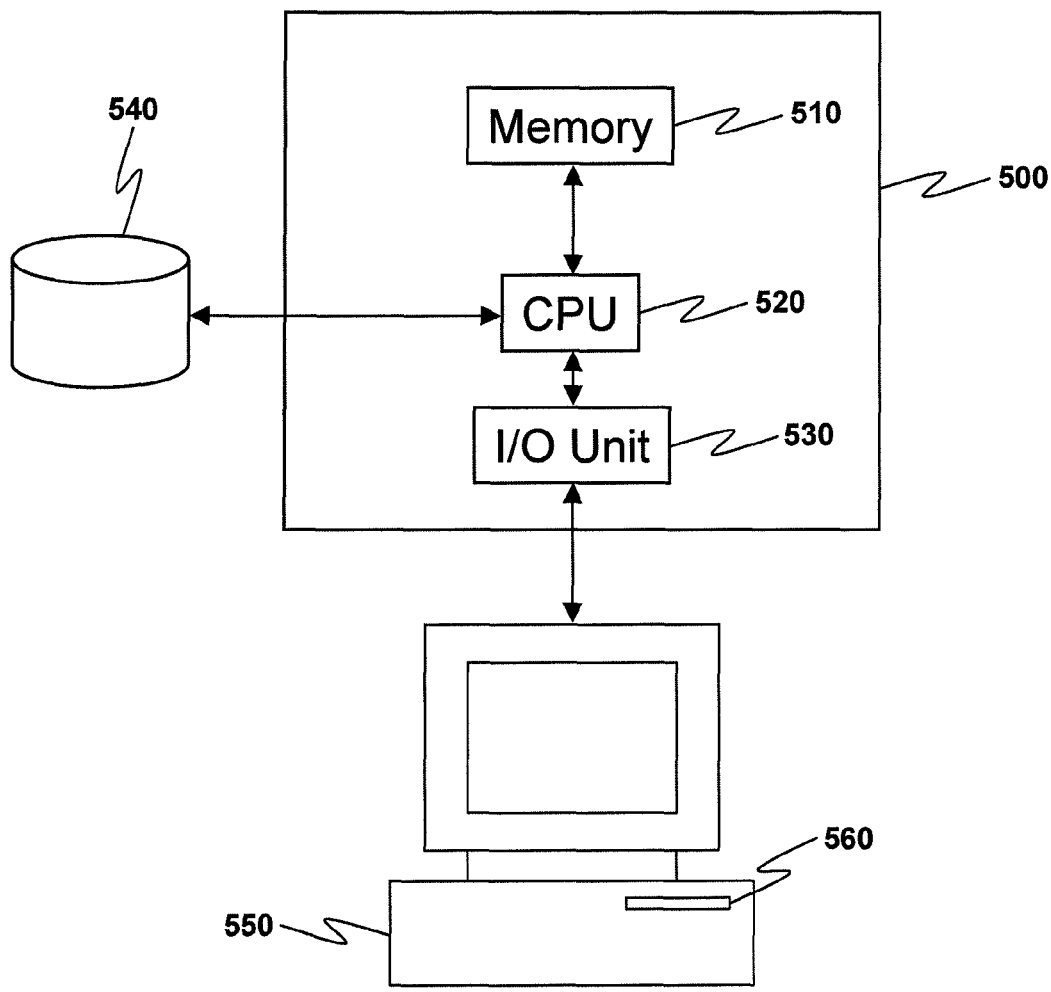
FIG. 3 is a block diagram illustrating an example of the environment in which the present invention is employed.

In any event the environment in which the present invention operates is shown in FIG. 3. The present invention operates in a data processing environment which effectively includes one or more of the computer elements shown in FIG. 3. In particular, computer 500 includes central processing unit (CPU) 520 which accesses programs and data stored within random access memory 510. Memory 510 is typically volatile

```
[1] add_set_carry rT, rA, rB
[2] move_from_carry rC
[3] double rC
[4] set_bit_on_not_zero rX, rT
[5] or rC, rC, rX
```

| | rT is zero<br>no carry<br>cc = 0<br>Register<br>Contents | | | | rT not zero<br>no carry<br>cc = 1<br>Register<br>Contents | | | | rT is zero<br>carry<br>cc = 2<br>Register<br>Contents | | | | rT not zero<br>carry<br>cc = 3<br>Register<br>Contents | | | |
|---|---|---|---|---|---|---|---|---|---|---|---|---|---|---|---|---|
| | rC | rT | rX | c | rC | rT | rX | c | rC | rT | rX | c | rC | rT | rX | c |
| [1] | n/a | 0 | n/a | 0 | n/a | not 0 | n/a | 0 | n/a | 0 | n/a | 1 | n/a | not 0 | n/a | 1 |
| [2] | 0 | 0 | n/a | 0 | 0 | not 0 | n/a | 0 | 1 | 0 | n/a | 1 | 1 | not 0 | n/a | 1 |
| [3] | 0 | 0 | n/a | 0 | 0 | not 0 | n/a | 0 | 2 | 0 | n/a | 1 | 2 | not 0 | n/a | 1 |
| [4] | 0 | 0 | 0 | 0 | 0 | not 0 | 1 | 0 | 2 | 0 | 0 | 1 | 2 | not 0 | 1 | 1 |
| [5] | 0 | 0 | 0 | 0 | 1 | not 0 | 1 | 0 | 2 | 0 | 0 | 1 | 3 | not 0 | 1 | 1 |

Figure 2:
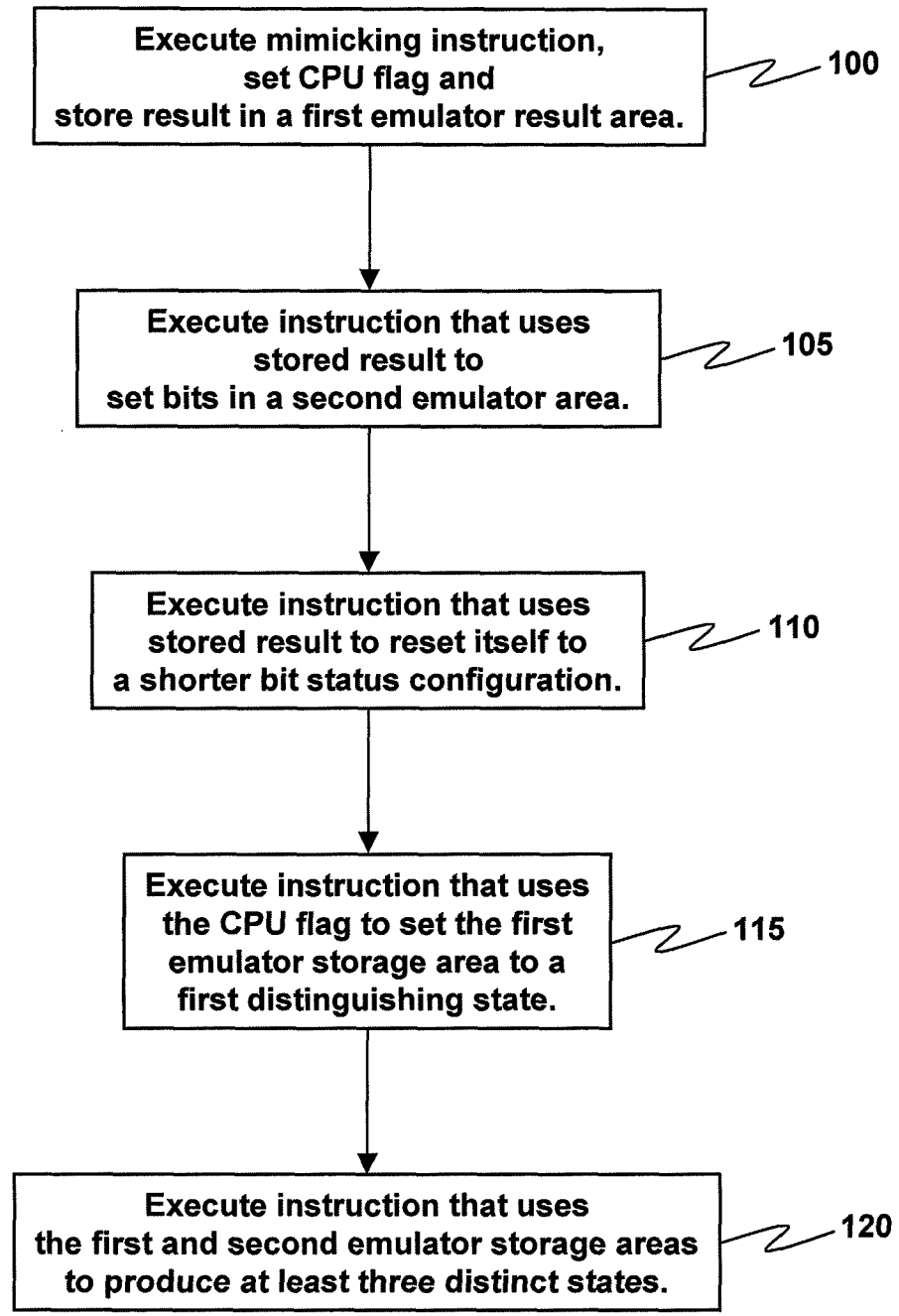
FIG. 2 is a flow chart of the present process in which branch instructions are avoided in the emulation of computer instructions.
Figure 4:
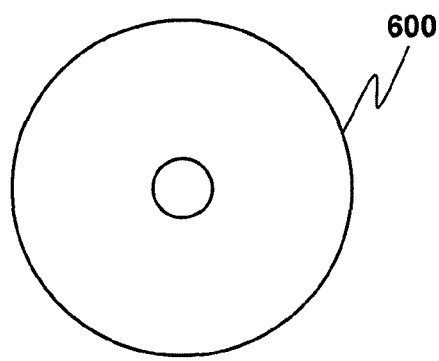
FIG. 4 is a top view of a typical computer readable medium containing program code which implements the methods of the present invention, as for example, as shown a Compact Disc (CD)

In general, this process has the following steps, none of which includes the use or execution of any branch instructions. First, an instruction (step 100 in FIG. 2) in the target machine's architecture is executed which mimics the instruction present in the source instruction stream in a manner which sets one or more target CPU flag bits and which places a result in a storage location (first location, such as rC above) accessible to the emulator. Next, an instruction (step 105) is executed which uses that result to set a bit or bits in another emulator controlled storage location (second location, such as rX above) to distinguish one or more case results. Next, the aforementioned result is used to provide a shorter bit configuration (one bit in the above example) which also serves to distinguish one or more case results (step 110). Next, an instruction is executed (step 115) which employs the first storage location to produce a result which distinguishes a different set of case results. Lastly, a target machine instruction is executed (step 120) which uses the results in the first in nature and accordingly such systems are provided with nonvolatile memory typically in the form of rotatable magnetic memory 540. While memory 540 is preferably a nonvolatile magnetic device, other media may be employed. CPU 520 communicates with users at consoles such as terminal 550 through Input/Output unit 530. Terminal 550 is typically one of many, if not thousands, of consoles in communication with computer 500 through one or more I/O unit 530. In particular, console unit 550 is shown as having included therein a device for reading medium of one or more types such as CD-ROM 600 shown in FIG. 4. Media 600, an example of which is shown in FIG. 4, comprises any convenient device including, but not limited to, magnetic media, optical storage devices and chips such as flash memory devices or so-called thumb drives.

Figure 5:
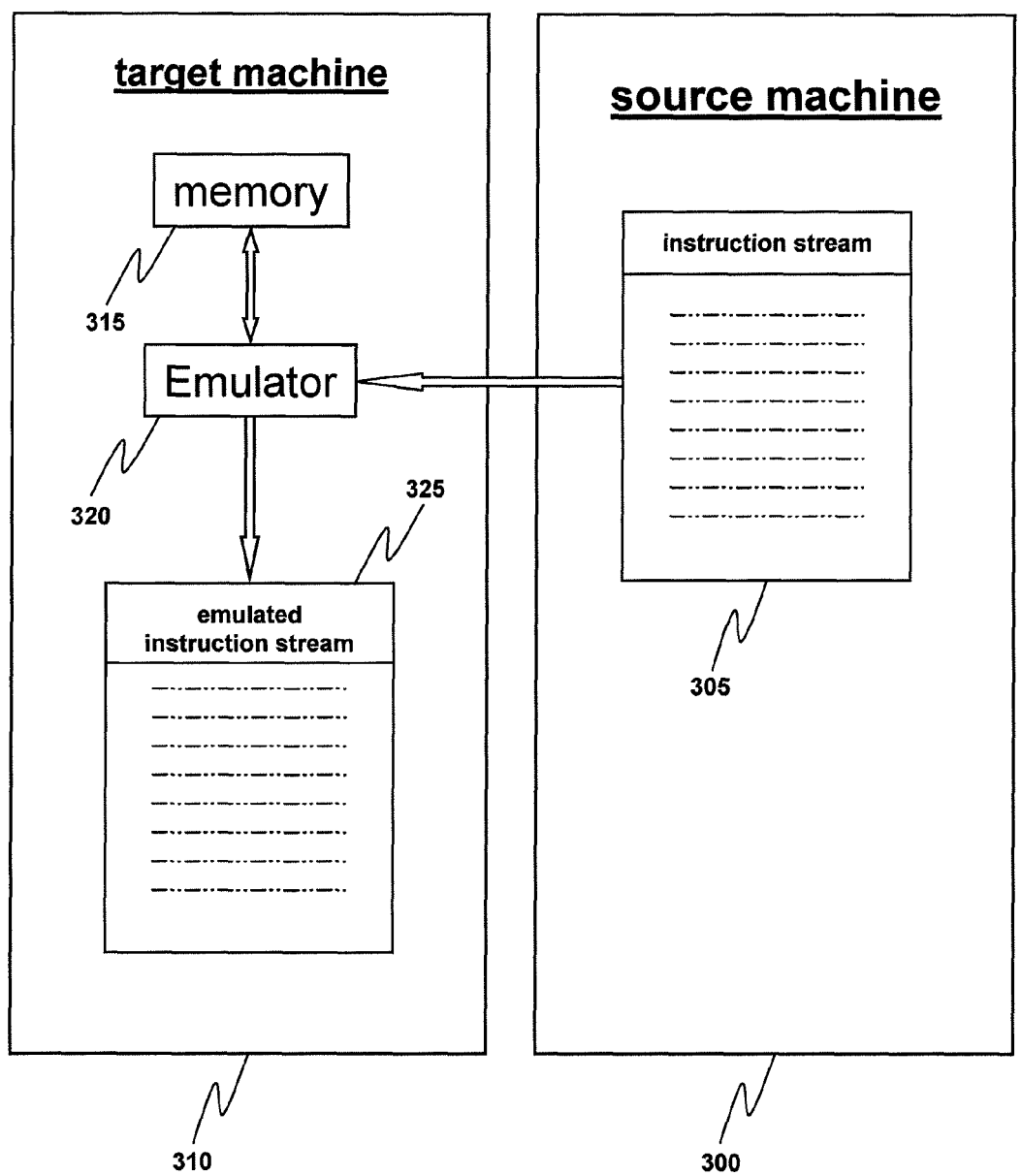
FIG. 5 is a block diagram illustrating the environment in which the present invention operates and is employed.

The typical emulation environment in which the present invention is employed is illustrated in FIG. 5. Emulators such as 320 accept, as input, instruction streams 305 representing machine or assembly language instructions which are designed to operate on source machine 300. Emulator 320 employees memory 315 in target machine 310 to produce a stream of instructions which are capable of executing on target machine 310. While FIG. 5 particularly shows operation within an emulation environment, it is also noted that the present invention contemplates a situation in which emulator 320 operates essentially as an interpreter in which the instructions are not only translated to the new architecture but in which they are also executed at essentially the same time.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A computer program product for emulating computer instructions from a source machine to produce sequences of instructions on a target machine, said computer program product comprising:
a non-transitory computer readable storage medium readable by a processor and storing instructions for execution by the processor for performing a method comprising:
obtaining by the target machine a computer instruction from the source machine, said source machine having a different architecture from said target machine; and
generating a sequence of target machine instructions which together operate to derive an encoding for a target machine condition code for the computer instruction, wherein the sequence of target machine instructions provides distinguishing information to distinguish between a plurality of possible outcomes for the target machine condition code, and directly calculates the target machine condition code without using branch instructions, the directly calculating comprising:
determining an intermediate condition code value, the intermediate condition code value being a provisional value for the target machine condition code and subject to change based on the distinguishing information; and
determining, based on the intermediate condition code value and based on the distinguishing information, the target machine condition code, wherein at least part of said distinguishing information is separate from the intermediate condition code value.

2. The computer program product of claim 1, wherein said calculation of the target machine condition code comprises using at least one of carry, sign, and overflow codes in the calculation.

3. The computer program product of claim 2, wherein said calculation employs temporary locations for storing intermediate results.

4. The computer program product of claim 1, wherein said method further includes executing said generated sequence of target machine instructions.

5. The computer program product of claim 4, wherein said executing occurs at substantially the same time as said generating.

6. The computer program product of claim 1, wherein the sequence of target machine instructions together operate to directly calculate the target machine condition code using at least one of addition, subtraction, and multiplication.

7. The computer program product of claim 1, wherein the distinguishing information distinguishes between outcomes for the following cases: a first operand and a second operand of a target machine instruction of the sequence of target machine instructions are equal; the first operand is greater than the second operand; and the first operand is less than the second operand.

8. The computer program product of claim 1, wherein the plurality of possible outcomes comprise a first set of one or more possible outcomes and a second set of one or more possible outcomes, wherein the determined intermediate condition code value distinguishes between the first set of one or more possible outcomes and the second set of one or more possible outcomes, and wherein the distinguishing information is applied to the intermediate condition code value to distinguish between possible outcomes within the first set of possible outcomes or within the second set of possible outcomes.

9. The computer program product of claim 8, wherein said first set of one or more possible outcomes comprises one case result and said second set of one or more possible outcomes comprises at least two other case results, and wherein said generating comprises:
mimicking an instruction present in a source instruction stream in a manner which sets one or more target central processing unit (CPU) flag bits and which stores a first result in a first storage location;
executing an instruction which uses said stored first result to set the distinguishing information, the distinguishing information comprising at least one bit in a second storage location;
using said stored first result to provide a second result in the first storage location;
executing an instruction which employs said second result to produce a third result in the first storage location, the third result being the determined intermediate condition code value which distinguishes between the one case result and the at least two other case results; and
executing an instruction which uses the third result in said first storage location and the at least one bit in the second storage location to provide an indication in which the one case result and the at least two other case results are distinguished, wherein using the at least one bit in the second storage location distinguishes between possible outcomes within the at least two other case results, and wherein the one case result and the at least two other case results represent condition codes of said source machine.

10. The computer program product of claim 1, wherein determining the intermediate condition code value comprises storing the intermediate condition code value in a condition code storage location as the provisional target machine condition code, and wherein determining the target machine condition code based on the distinguishing information and the intermediate condition code value comprises performing at least one operation on the intermediate condition code value stored in the condition code storage location to obtain the target machine condition code and storing the target machine condition code in the condition code storage location.

11. A computer system for emulating computer instructions from a source machine to produce sequences of instructions on a target machine, the computer system comprising:
a memory; and
a processor in communication with the memory, wherein the computer system is capable of performing a method, the method comprising:
obtaining by the target machine a computer instruction from the source machine, said source machine having a different architecture from said target machine; and generating a sequence of target machine instructions which together operate to derive an encoding for a target machine condition code for the computer instruction, wherein the sequence of target machine instructions provides distinguishing information to distinguish between a plurality of possible outcomes for the target machine condition code, and directly calculates the target machine condition code without using branch instructions, the directly calculating comprising:
- determining an intermediate condition code value, the intermediate condition code value being a provisional value for the target machine condition code and subject to change based on the distinguishing information; and
- determining, based on the intermediate condition code value and based on the distinguishing information, the target machine condition code, wherein at least part of said distinguishing information is separate from the intermediate condition code value.

12. The computer system of claim 11, wherein said calculation of the target machine condition code comprises using at least one of carry, sign, and overflow codes in the calculation.

13. The computer system of claim 11, wherein said method further includes executing said generated sequence of target machine instructions.

14. The computer system of claim 13, wherein said executing occurs at substantially the same time as said generating.

15. The computer system of claim 11, wherein the plurality of possible outcomes comprise a first set of one or more possible outcomes and a second set of one or more possible outcomes, the first set of one or more possible outcomes comprising one case result and the second set of one or more possible outcomes comprising at least two other case results, wherein the determined intermediate condition code value distinguishes between the one case result and the at least two other case results, and wherein said generating comprises:
- mimicking an instruction present in a source instruction stream in a manner which sets one or more target central processing unit (CPU) flag bits and which stores a first result in a first storage location;
- executing an instruction which uses said stored first result to set the distinguishing information, the distinguishing information comprising at least one bit in a second storage location;
- using said stored first result to provide a second result in the first storage location;
- executing an instruction which employs said second result to produce a third result in the first storage location, the third result being the determined intermediate condition code value which distinguishes between the one case result and the at least two other case results; and
- executing an instruction which uses the third result in said first storage location and the at least one bit in the second storage location to provide an indication in which the one case result and the at least two other case results are distinguished, wherein using the at least one bit in the second storage location distinguishes between possible outcomes within the at least two other case results, and wherein the one case result and the at least two other case results represent condition codes of said source machine.

16. A method for emulating computer instructions from a source machine to produce sequences of instructions on a target machine, said method comprising:
obtaining by the target machine a computer instruction from the source machine, said source machine having a different architecture from said target machine; and
generating a sequence of target machine instructions which together operate to derive an encoding for a target machine condition code for the computer instruction, wherein the sequence of target machine instructions provides distinguishing information to distinguish between a plurality of possible outcomes for the target machine condition code, and directly calculates the target machine condition code without using branch instructions, the directly calculating comprising:
- determining an intermediate condition code value, the intermediate condition code value being a provisional value for the target machine condition code and subject to change based on the distinguishing information; and
- determining, based on the intermediate condition code value and based on the distinguishing information, the target machine condition code, wherein at least part of said distinguishing information is separate from the intermediate condition code value.

17. The method of claim 16, wherein said calculation of the target machine condition code comprises using at least one of carry, sign, and overflow codes in the calculation.

18. The method of claim 16, wherein said method further includes executing said generated sequence of target machine instructions.

19. The method of claim 18, wherein said executing occurs at substantially the same time as said generating.

20. The method of claim 16, wherein the plurality of possible outcomes comprise a first set of one or more possible outcomes and a second set of one or more possible outcomes, the first set of one or more possible outcomes comprising one case result and the second set of one or more possible outcomes comprising at least two other case results, wherein the determined intermediate condition code value distinguishes between the one case result and the at least two other case results, and wherein said generating comprises:
- mimicking an instruction present in a source instruction stream in a manner which sets one or more target central processing unit (CPU) flag bits and which stores a first result in a first storage location;
- executing an instruction which uses said stored first result to set the distinguishing information, the distinguishing information comprising at least one bit in a second storage location;
- using said stored first result to provide a second result in the first storage location;
- executing an instruction which employs said second result to produce a third result in the first storage location, the third result being the determined intermediate condition code value which distinguishes between the one case result and the at least two other case results; and
- executing an instruction which uses the third result in said first storage location and the at least one bit in the second storage location to provide an indication in which the one case result and the at least two other case results are distinguished, wherein using the at least one bit in the second storage location distinguishes between possible outcomes within the at least two other case results, and wherein the one case result and the at least two other case results represent condition codes of said source machine.

* * * * *